United States Patent
Molinari

[11] Patent Number: 5,894,785
[45] Date of Patent: Apr. 20, 1999

[54] PERCOLATOR OF MOCHA TYPE, FOR ESPRESSO COFFEE OR OTHER SIMILAR DRINKS

[75] Inventor: Giuseppe Molinari, Modena, Italy

[73] Assignee: Caffe' Molinari S.P.A., Modena, Italy

[21] Appl. No.: 08/940,810

[22] Filed: Sep. 30, 1997

[30] Foreign Application Priority Data

Oct. 10, 1996 [IT] Italy .................... RE96A0081

[51] Int. Cl.⁶ .................................. A47J 31/00
[52] U.S. Cl. .................. 99/303; 99/295; 99/292
[58] Field of Search .................. 99/292, 303, 295

[56] References Cited

U.S. PATENT DOCUMENTS

| | | | |
|---|---|---|---|
| 3,077,156 | 2/1963 | Egi et al. | 99/303 X |
| 3,975,996 | 8/1976 | Vitous | 99/303 X |

FOREIGN PATENT DOCUMENTS

| | | |
|---|---|---|
| 0339440 | 11/1989 | European Pat. Off. . |
| 401456 | 12/1990 | European Pat. Off. ........ 99/303 |
| 0631948 | 1/1995 | European Pat. Off. . |
| 1320522 | 1/1963 | France . |
| 2041380 | 1/1971 | France . |
| 0436322 | 10/1926 | Germany . |
| 422216 | 7/1947 | Italy .................... 99/303 |
| 1119891 | 7/1968 | United Kingdom . |

*Primary Examiner*—Reginald L. Alexander
*Attorney, Agent, or Firm*—Birch, Stewart, Kolasch & Birch, LLP

[57] ABSTRACT

The percolator comprises a substantially cylindrical decoction chamber (9) through which water passes from the lower chamber (7) to the upper chamber (8), a counteracting surface (16) upperly bounding the decoction chamber (9), and an annular gasket (17) positioned against the counteracting surface to form a seal between the lower chamber (7), the upper chamber (8) and the decoction chamber (9). Within the decoction chamber (9) there is provided a support element (30) movable in a vertical direction and arranged to support a bag (20) of ground substance in the form of a substantially cylindrical tablet; elastic thrust member (35) is also provided within the decoction chamber (9) to vertically urge the support element (30) in such a manner as to elastically press the bag (10) against the counteracting surface (16) and/or against the annular gasket (17).

8 Claims, 4 Drawing Sheets

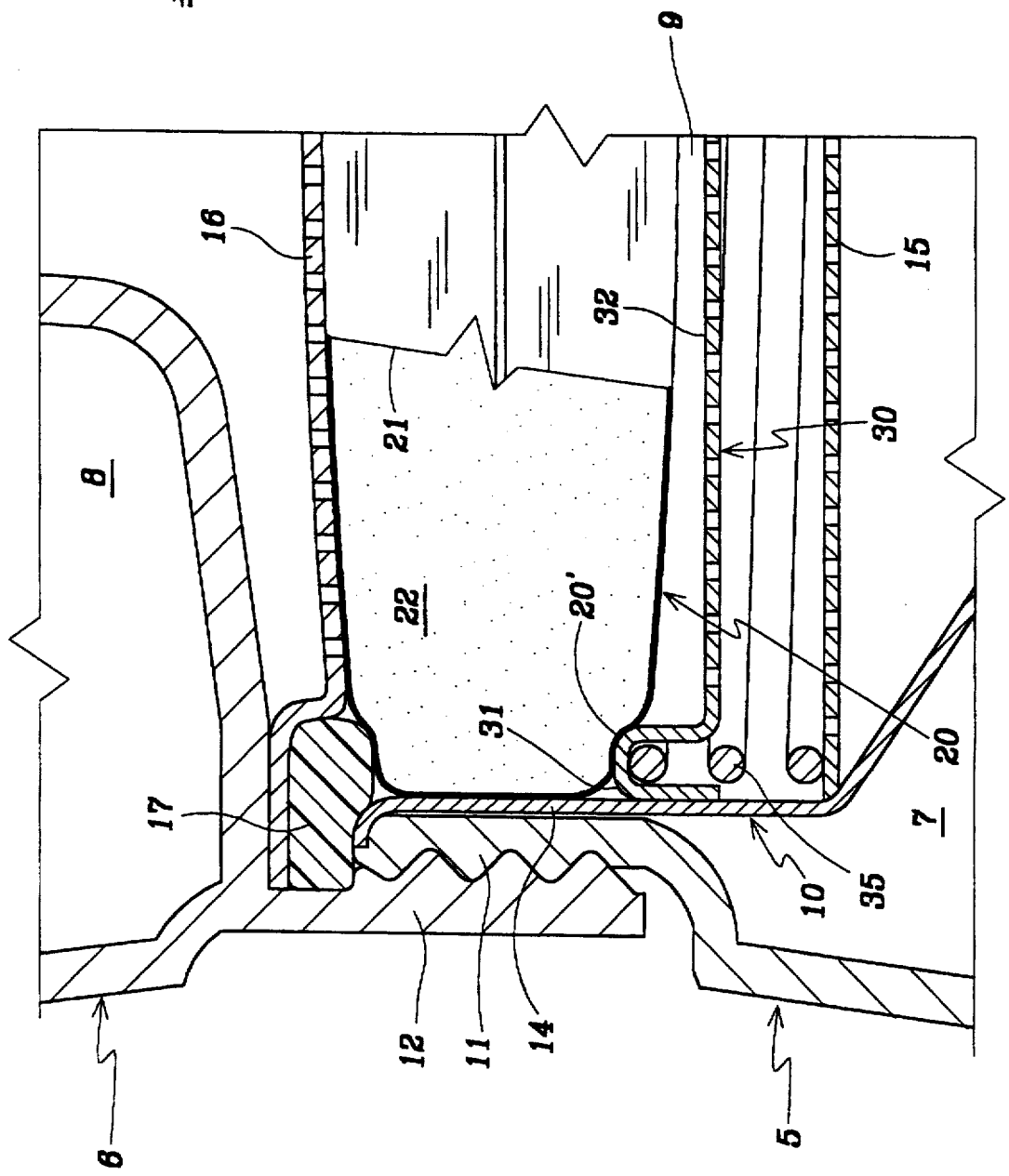

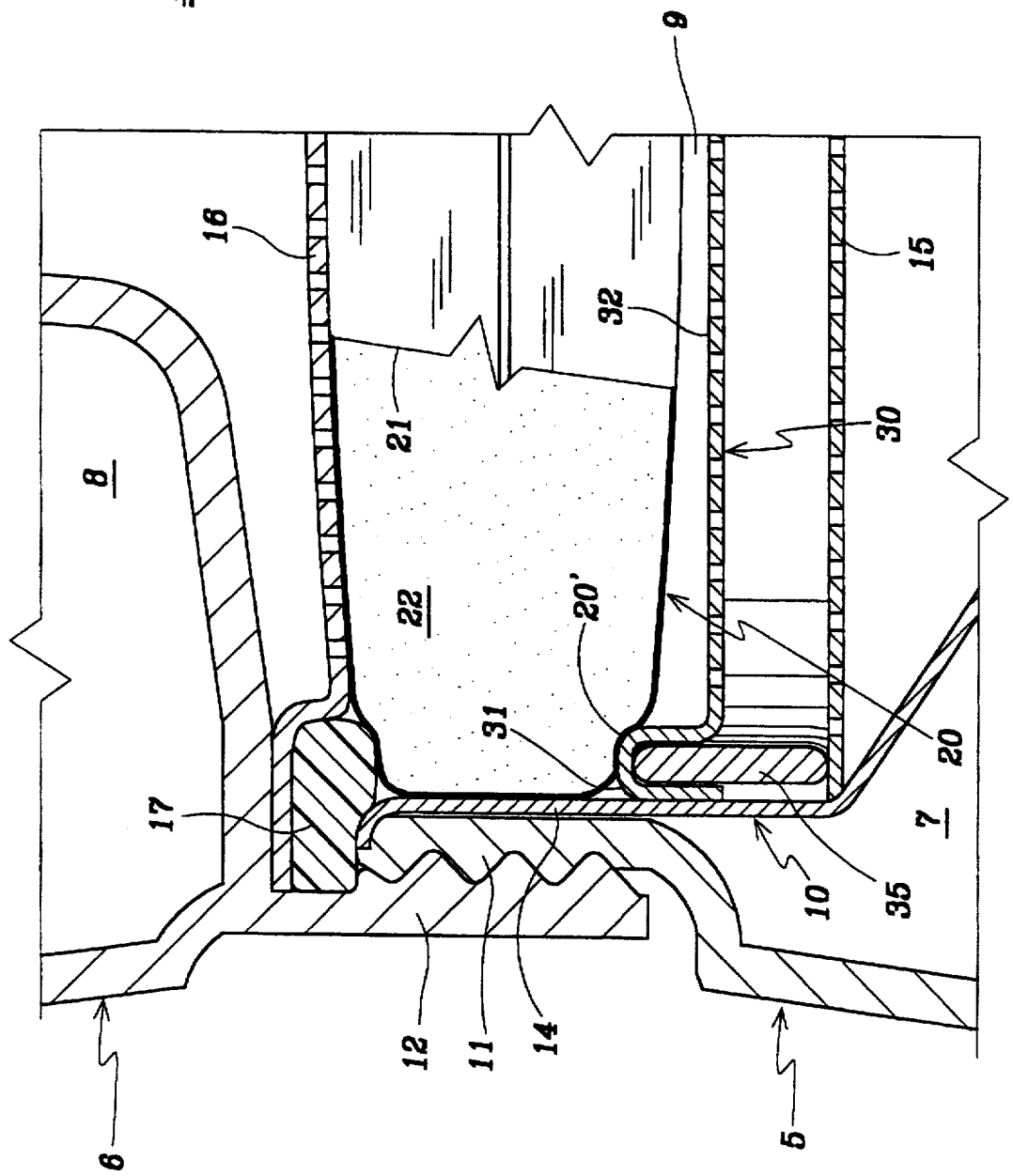

PERCOLATOR OF MOCHA TYPE, FOR ESPRESSO COFFEE OR OTHER SIMILAR DRINKS

BACKGROUND OF THE INVENTION

The present invention relates to a domestic percolator of the mocha type for espresso coffee, or other similar drinks such as tea, barley, camomile or other infusions.

It has been known for some time to use ground coffee packaged in permeable paper bags (filter paper) in the form of a roughly cylindrical tablet, containing a predetermined precompressed quantity of coffee. An example of a bag of this type is shown in FIG. 1.

However, such bags are used with motorized espresso coffee machines, in which the hot water is passed through the decoction chamber by a pump driven by an electric motor.

Notwithstanding the considerable recognized advantages to the user in using such coffee bags, there are still no known percolators of the mocha type able to use these bags.

SUMMARY OF THE INVENTION

An object of the present invention is to therefore to provide a mocha-type percolator able to use said coffee bags or substantially similar bags containing other substances such as barley, tea, camomile etc., to form the corresponding drink therefrom.

A further object of the present invention is to provide a mocha-type percolator which can be used traditionally (with loose ground coffee) or with said coffee (or other substance) bags.

A Further object of the present invention is to enable any commercially available percolator of traditional percolator type to use said coffee (or other substance) bags.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention is applied to a percolator comprising a lower chamber for containing water to be heated, and an upper chamber in which the drink is collected.

The percolator also comprises, for containing the ground coffee, an in termediate receiver positioned in the intermediate region between said chambers and laterally bounding a substantially cylindrical decoction chamber through which water passes from the lower chamber to the upper chamber, and a counteracting surface upwardly bounding the decoction chamber. Against the counteracting surface there is positioned an annular gasket forming a seal between the lower chamber, the upper chamber and the decoction chamber.

The present invention is based on the concept of positioning within the decoction chamber a support element movable in a vertical direction and arranged to support a bag of ground coffee (or other substance) in the form of a substantially cylindrical tablet, and elastic thrust means positioned within the decoction chamber and arranged to urge the support element in a vertical direction so as to elastically press the bag of coffee (or other substance) against the counteracting surface and/or against the annular gasket.

The elastic means are particularly dimensioned such that, when the two constituent parts of the percolator are separated from each other, the bag placed in the decoction chamber projects a suitable amount beyond the upper edge of the chamber.

This amount is such that the elastic means are compressed by a suitable load when the two parts are connected together.

Hence, the decoction chamber varies in its volume, and is tightened against the bag of coffee (or other substance) by the thrust of the elastic means. The bag has a certain degree of natural deformability, and hence assumes the shape of the chamber by bearing sufficiently intimately against its walls, in particular against the cylindrical lateral wall and against the annular gasket. In this manner the hot water which passes upwards through the decoction chamber is prevented from seeping about the bag. Instead the water is compelled to pass through the entire thickness or the bag so as to substantially completely decoct the ground substance contained in the bag.

BRIEF DESCRIPTION OF THE DRAWING

The present invention is described in detail hereinafter with the aid of the accompanying figures, which illustrate a non-exclusive embodiment thereof, wherein

FIG. 3 is an enlarged detail of a portion of FIG. 2;

FIG. 5 is a detail similar to that of FIG. 2, of a second embodiment of the present invention.

Figure 2:
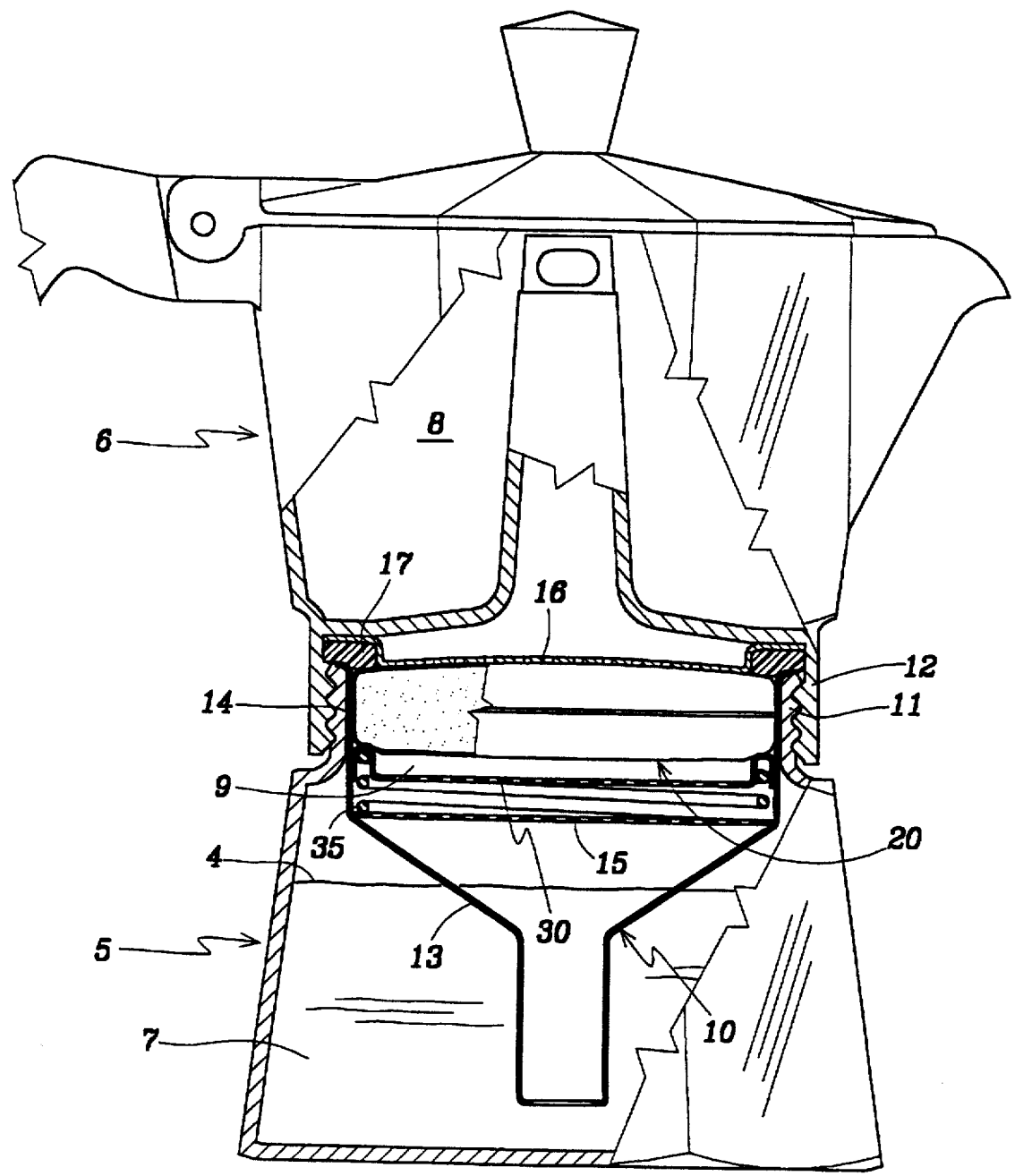
FIG. 2 is an axial section through the percolator of the present invention.

The percolator shown in FIG. 2 is a mocha percolator almost completely of the traditional type. It also has the usual dimensions of a mocha percolator.

As in the case of any traditional percolator, the percolator of the invention comprises a lower part 5 having a lower chamber 7 for containing the water to be heated, and an upper part 6 having an upper chamber 8 in which the completed drink is collected.

The parts 5 and 6 are connected together at their relative upper mouth and lower mouth respectively. The lower part 5 comprises an externally threaded cylindrical upper neck 11, while the upper part comprises an internally threaded cylindrical lower neck 12. To connect the two parts 3 and 6 together, the neck 11 is inserted into the neck 12 and one part is screwed into the other.

In the intermediate region between said chambers 7 and 8 there is provided an intermediate receiver 10 which when used traditionally contains the ground coffee.

The receiver 10 is roughly in the form of a funnel, and comprises a lower portion 13 which tapers downwardly into the chamber 7 forming a conduit the lower end of which is positioned a short distance from the chamber base.

Above the portion 13 there is a substantially cylindrical upper portion 14 laterally surrounding a decoction chamber 9, intermediate between the chambers 7 and 8, in which traditionally the ground coffee is placed to be decocted therein by the passage of water from the lower chamber to the upper chamber.

The chamber 9 is provided with a thin circular base 15 provided with numerous holes.

The decoction chamber 9 is defined by an upper circular cover-piece 16 provided with numerous holes, its lower surface acting as a counteracting means for the material contained in the chamber.

The upper edge of the cylindrical portion 14 is slightly turned outwards to rest against the upper edge of the neck 11.

Against the peripheral region of the cover-piece 10 there is positioned an annular gasket 17 which (when the two parts 5 and 6 are connected together) presses both against the upper edge of the neck 11 and against the upper edge of the portion 14. The gasket 17 hence forms a seal between the upper chamber 9 and the decoction chamber 9, and between the lower chamber 7 and the decoction chamber 9.

All the aforedescribed elements are of the traditional type. They form a traditional mocha percolator to which the new elements described hereinafter are added.

The percolator of the present invention enables coffee (or other similar substances for drinks, such as tea, barley, camomile and other infusions) in ground form to be used packaged in predetermined measures in permeable paper bags 21, to assume the form of a large tablet. These tablets contain a predetermined quantity of ground substance 22 precompressed in an optimum manner, and are of roughly cylindrical shape with dimensions which enable them to be contained in the portion 14 of a traditional intermediate decoction receiver 10.

Tablets 20 can be obviously used containing different numbers of measures of coffee (or other substance), as is currently done, to be housed in a receiver 10 of corresponding size.

Figure 1:
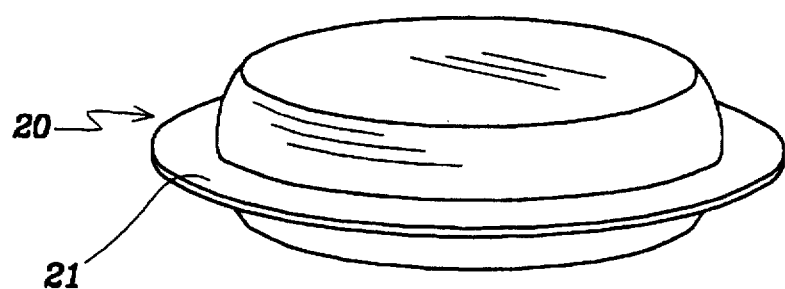
FIG. 1 is a perspective view of a coffee (or other substance) bag suitable for use by a percolator according to the present invention.

An example of a bag 20 of the said type is shown in FIG. 1.

DETAILED DESCRIPTION OF THE INVENTION

According to the present invention, a support element 30, in the form of a thin disc provided with holes, is provided within the decoction chamber 9 to support a bag 20, and has a peripheral annular surface 31 which presses against the periphery of the bag 20.

Below the support element 30 there are provided, within the decoction chamber 9, elastic thrust means 35 arranged to urge the support element 30 upwards so that it presses the coffee bag 20 against the lower surface of the cover-piece 16, and the peripheral annular surface 31 of the element 30 against the corresponding peripheral region 20' of the bag.

The element 30 can be substantially flat. However, preferably (as shown in the figures), it is shaped to define an annular peripheral portion, having said peripheral pressing surface 31, and a central portion 32 which is depressed relative to the peripheral surface 31 and as such applies very little or no pressure against the bag 20.

According to a further embodiment (not shown in the figures), the peripheral pressing surface 31 is provided in the cover-piece 16 (instead of in the element 30). The cover-piece 16 hence has an annular peripheral portion (pressing surface) which projects downwards from its central portion. Hence, the central portion applies very little or no pressure against the bag 20.

According to yet a further embodiment (not shown in the figures), both the support element 30 and the cover-piece 16 are shaped in the aforedescribed manner.

Figure 4:
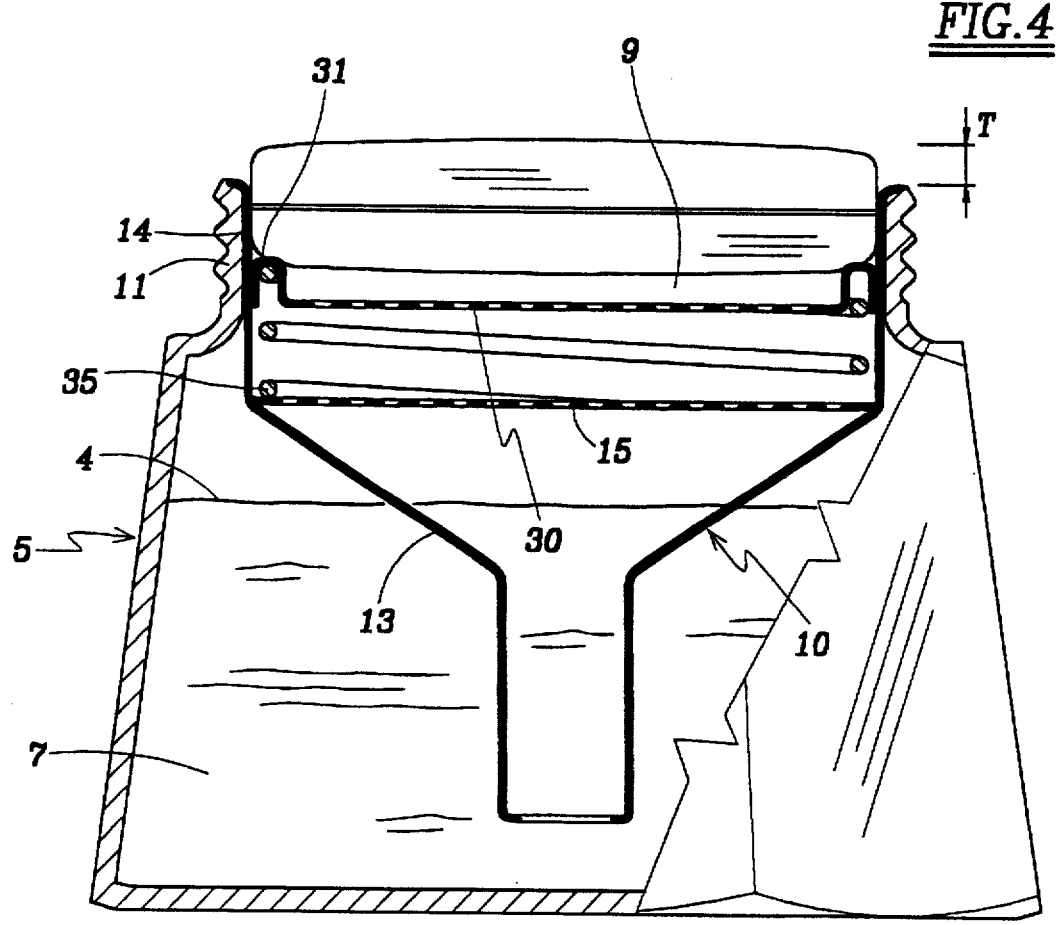
FIG. 4 shows the lower part of the percolator of FIG. 2, when separated from the upper part.

In the embodiment shown in FIGS. 2–4, the thrust means 35 consist of a spiral spring, in which the upper end rests below the peripheral surface 31 of the element 30, and the lower end rests on the lower base 15.

Alternatively, the thrust means 35 can consist of an annular element of elastomer material, as shown in FIG. 5, or consist of spring washers or other equivalent means.

In operation, water is fed into the lower chamber 7 in such a quantity that its level 4 is higher than the lower end of the lower portion 13. As is well known, by virtue of the thrust produced by the steam which, on heating, forms in the chamber 7 above the level 4, the water is made to rise into the upper chamber 8 by passing through the decoction chamber 9 in which the bag 20 is positioned.

The idea upon which the present invention is based is to make s the decoction chamber vary its volume, and bear tightly against the coffee (or other substance) bag 20 by virtue of the thrust of the elastic means 35.

To achieve this, the spring 95 is sized in such a manner that when the two parts 5 and 6 have been separated from each other, the bag 20 placed on the support element 30 in the chamber 9 projects by a suitable amount T (FIG. 4) beyond the upper edge of the portion 14 and of the neck 11.

This amount T is such that when the two parts 5 and 6 are connected together, and the upper edge of the portion 14 has hence been brought against the gasket 17, s the over-piece s displaces the bag 20 downwards to push it completely into the portion 14. This displacement loads the spring 35, which hence provides the required reaction thrust.

The bag 20 has a diameter roughly equal to that of the decoction chamber 9, and also has a certain degree of deformability. It hence assumes the shape of the chamber to bear in a sufficiently intimate manner against its walls, in particular against the lateral wall (wall of portion 14) and against the annular gasket 17. In this manner, the water which passes upwards through the decoction chamber 9 is prevented from undergoing any seepage about the bag 20 without passing through it. Instead the water is compelled to pass through the entire thickness of the bag 20, so as to substantially completely decoct the ground substance contained in the bag.

In a preferred embodiment (shown in the figures), the thrust provided by the spring 35 (or other thrust means), by which the annular surface 31 presses the bag 20, is located in an annular peripheral region of the bag, so that in this annular region a relatively intense substance compression is achieved to create a seal preventing water seepage directed centrifugally, with the water emerging laterally from the bag and only grazing it without passing through its entire thickness.

The thrust provided by the spring 35 is applied only to an annular peripheral region 20' of the bag 20, this region hence being deformed and squeezed.

The remaining part of the bag 20 (which contains nearly all the ground substance) is substantially not subjected to external pressure. Hence this remainder can expand naturally during decoction and oppose relatively little obstacle to passage of the hot water. The water consequently passes through the remaining part of the bag 20 without seeping sideways centrifugally through the region 20', because in that region the ground product is more greatly compressed and hence poses a greater obstacle to water passage.

The force provided by the spring 35 must not be excessively large, in order not to damage the actual bag 21.

Advantageously the gasket 17 can project downwards beyond the lower surface of the cover-piece 16, so as to define against the bag 20, as a result of the thrust provided by the spring 35, an annular peripheral pressing region opposite and corresponding to the pressing region defined by the support element 30, and cooperating with this latter region to prevent any water seepage which does not pass through the entire thickness of the bag 20.

Alternatively, the gasket 17 may alone provide on the bag an annular pressing region such as to prevent any water seepage which does not pass through the entire thickness of the bag 20.

The present invention is also suitable for use with semi-rigid bags having a substantially rigid cylindrical lateral wall plus a base and top of filter paper. In this case the seal which compels the water to pass through the entire bag is created mainly by the gasket 17, against which the upper edge of this lateral wall is pressed.

Numerous modifications of a practical and applicational nature can be applied to the invention, but without leaving the scope of the inventive idea as claimed hereinafter.

I claim:

1. A mocha-type percolator for espresso coffee or other similar drinks comprising:

a lower chamber for containing water to be heated;

an upper chamber in which the drink is to be collected;

an intermediate receiver positioned between the lower and upper chambers, said intermediate receiver defining a substantially cylindrical decoction chamber through which water passes from the lower chamber to the upper chamber;

a counteracting surface defining the top of the decoction chamber;

and an annular gasket positioned against the counteracting surface to form a seal between the lower chamber, the upper chamber and the decoction chamber, wherein a support element is disposed within the decoction chamber to be movable in a vertical direction, said support element being arranged to support a bag of ground substance in the form of a substantially cylindrical tablet; elastic thrust means positioned within the decoction chamber to vertically urge the support element to elastically press the bag against the counteracting surface and/or against the annular gasket.

2. The mocha-type percolator as claimed in claim 1, wherein the support element, or the counteracting surface, has an annular peripheral surface which is raised relative to the central portion thereof and which presses against the periphery of the bag, said thrust means being arranged to urge said annular peripheral surface of the support element against the corresponding peripheral region of the bag with a thrust suitable for forming a seal against any peripheral water seepage which does not pass through the entire thickness of the bag.

3. The mocha-type percolator as claimed in claim 2, wherein the annular gasket projects downwards against the bag, and as a result of the thrust provided by the thrust means, an annular peripheral pressing surface presses against the annular peripheral surface of the support element.

4. The mocha-type percolator as claimed in claim 2, wherein the support element, or the counteracting surface has a central portion depressed relative to the peripheral surface and arranged to apply little or no pressure against the bag.

5. The mocha-type percolator as claimed in claim 1, wherein the thrust means is a spiral spring.

6. The mocha-type percolator as claimed in claim 1, wherein the thrust means is an annular element of elastomeric material.

7. The mocha-type percolator as claimed in claim 1, wherein the thrust means are spring washers.

8. The mocha-type percolator as claimed in claim 1, wherein the elastic means are sized in such a manner that when the lower and upper chambers are separated from each other, the bag placed on the support element in the chamber projects by a suitable amount above the upper edge of a neck of said lower chamber such that the elastic means is compressed with a suitable load when the lower and upper chambers are connected together.

* * * * *